United States Patent [19]
van den Brink

[11] Patent Number: 4,658,476
[45] Date of Patent: Apr. 21, 1987

[54] DEVICE FOR CONVEYING CHICKENS TO A SLAUGHTERING PLANT

[76] Inventor: Hendrikus G. van den Brink, Edeseweg 111, 6732 Da Harskamp, Netherlands

[21] Appl. No.: 675,803

[22] Filed: Nov. 28, 1984

[30] Foreign Application Priority Data

Nov. 28, 1983 [NL] Netherlands ............... 8304072

[51] Int. Cl.⁴ ............... A22C 21/00; A01K 37/00
[52] U.S. Cl. ............................. 17/11; 17/24; 119/17; 119/97 R
[58] Field of Search ............ 17/11, 24; 119/97 R, 119/17

[56] References Cited

U.S. PATENT DOCUMENTS 4,272,863 6/1981 Parker, Jr. ............... 119/97 R X

Primary Examiner—Willie G. Abercrombie
Attorney, Agent, or Firm—Olson and Olson

[57] ABSTRACT

Device for conveying living chickens to a slaughtering plant, comprising means (6) for separating the chickens one by one, conveying them with the separated legs into leg clamps (39, 40) on a turn tables (38) which cooperate with means (42) which synchronize all chickens into an identical position in which they hang with their heads downwardly and with the legs into a position which allows taking over of each chicken by clamping frames with neck clamp (55) and leg clamps (56, 57) of an other conveyor (4) which feeds the chickens towards the slaughter hooks (59) of the slaughterhouse conveyor (5).

6 Claims, 13 Drawing Figures

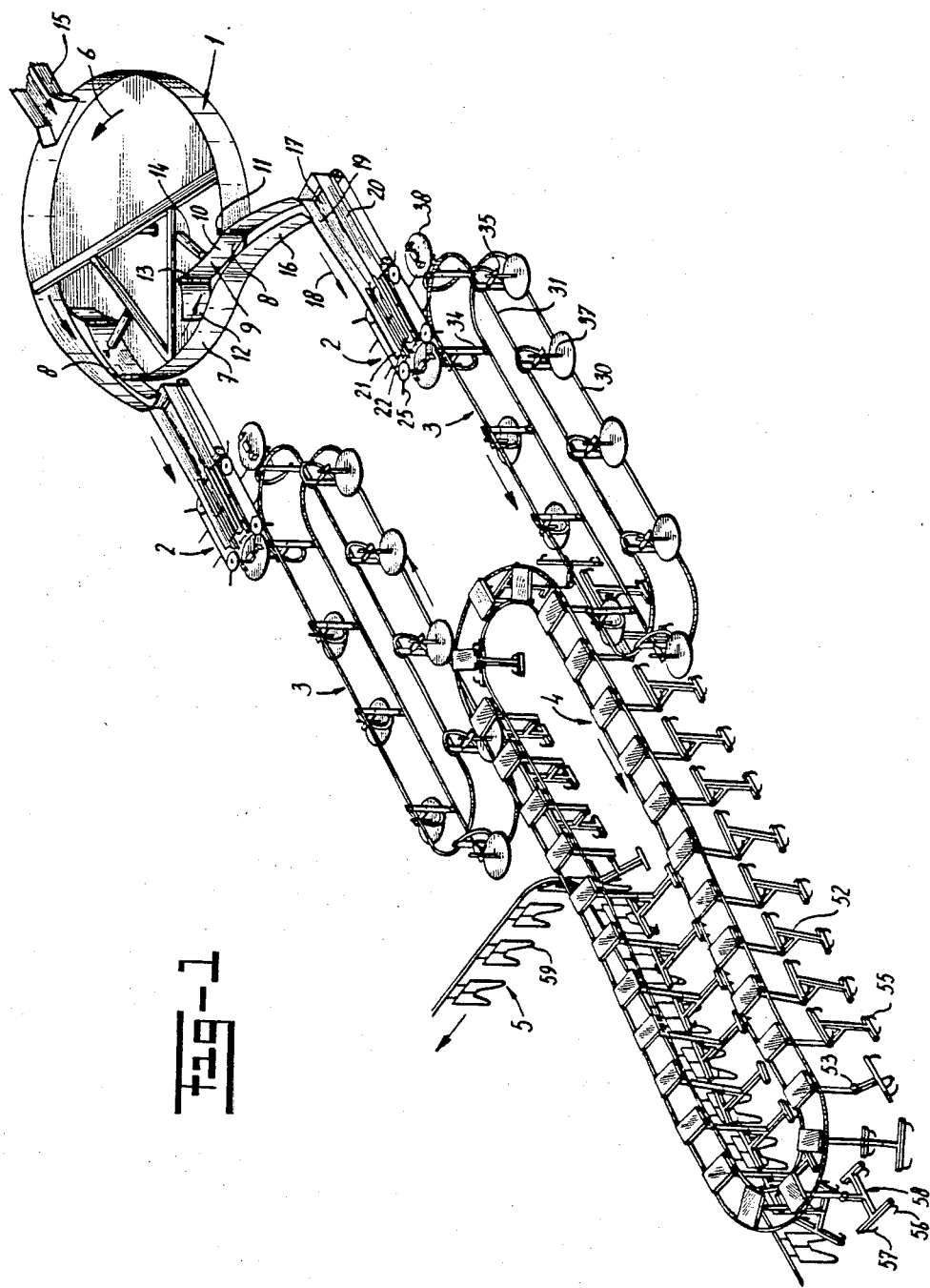

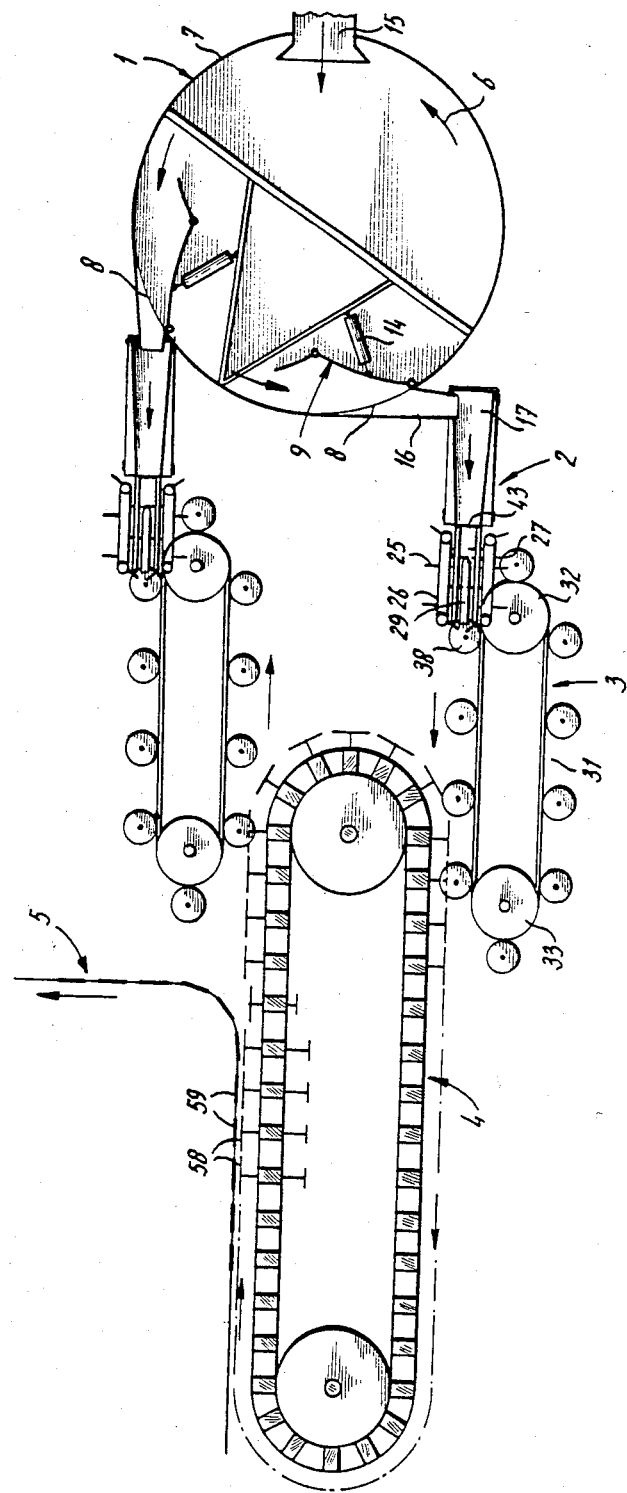

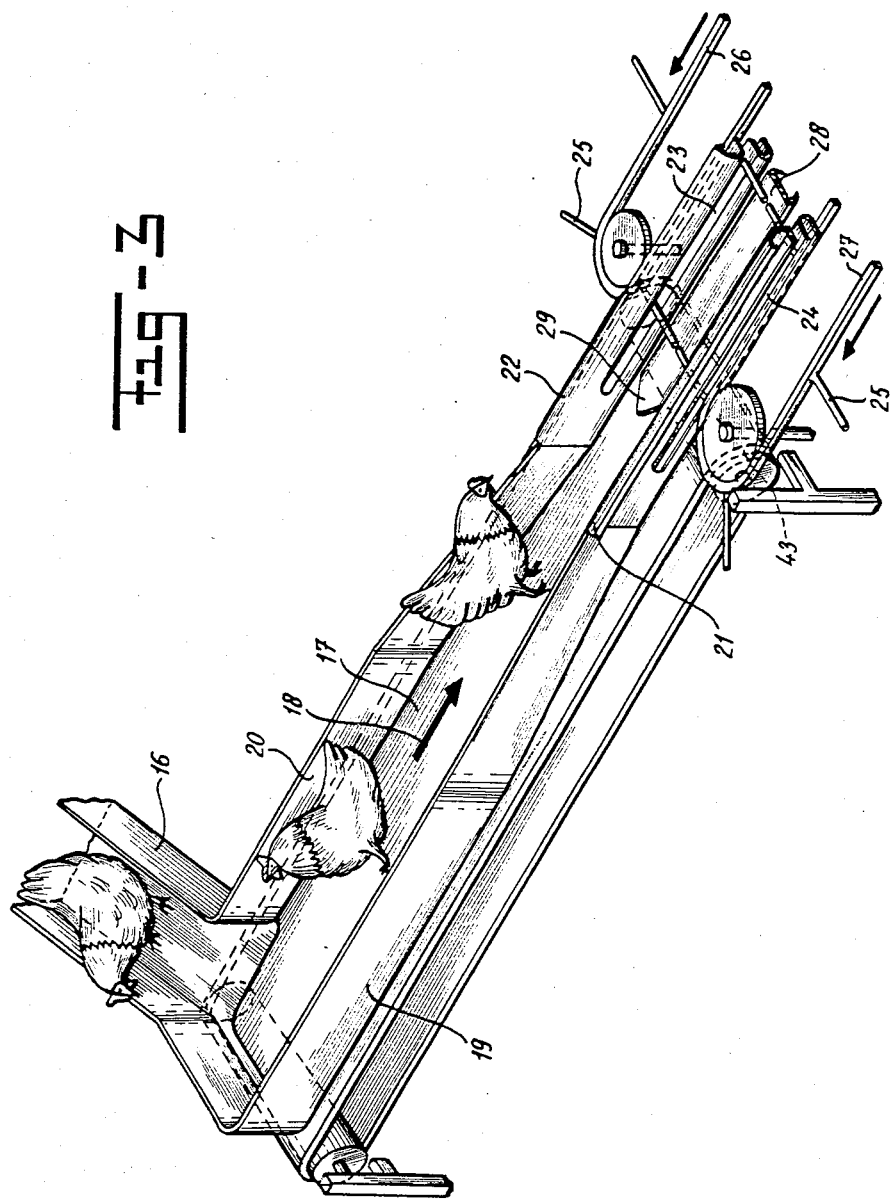

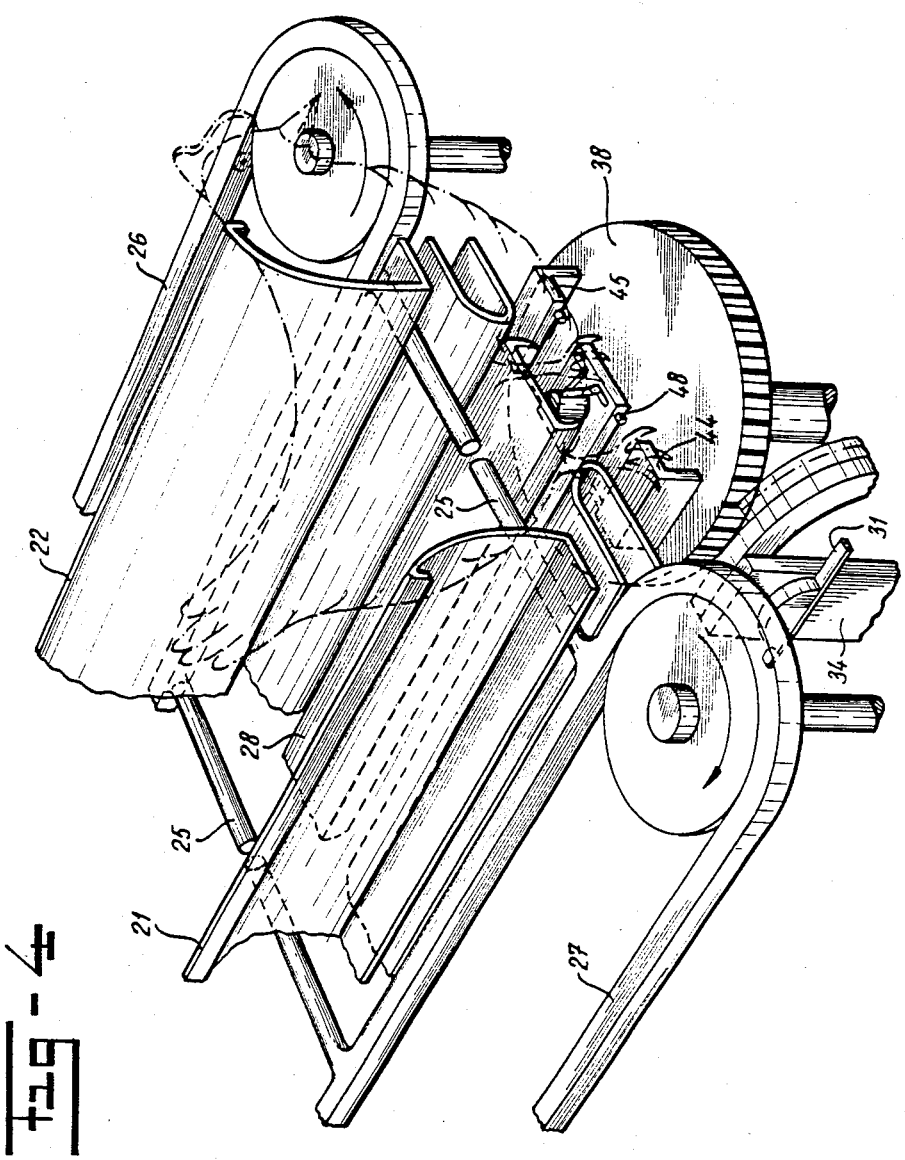

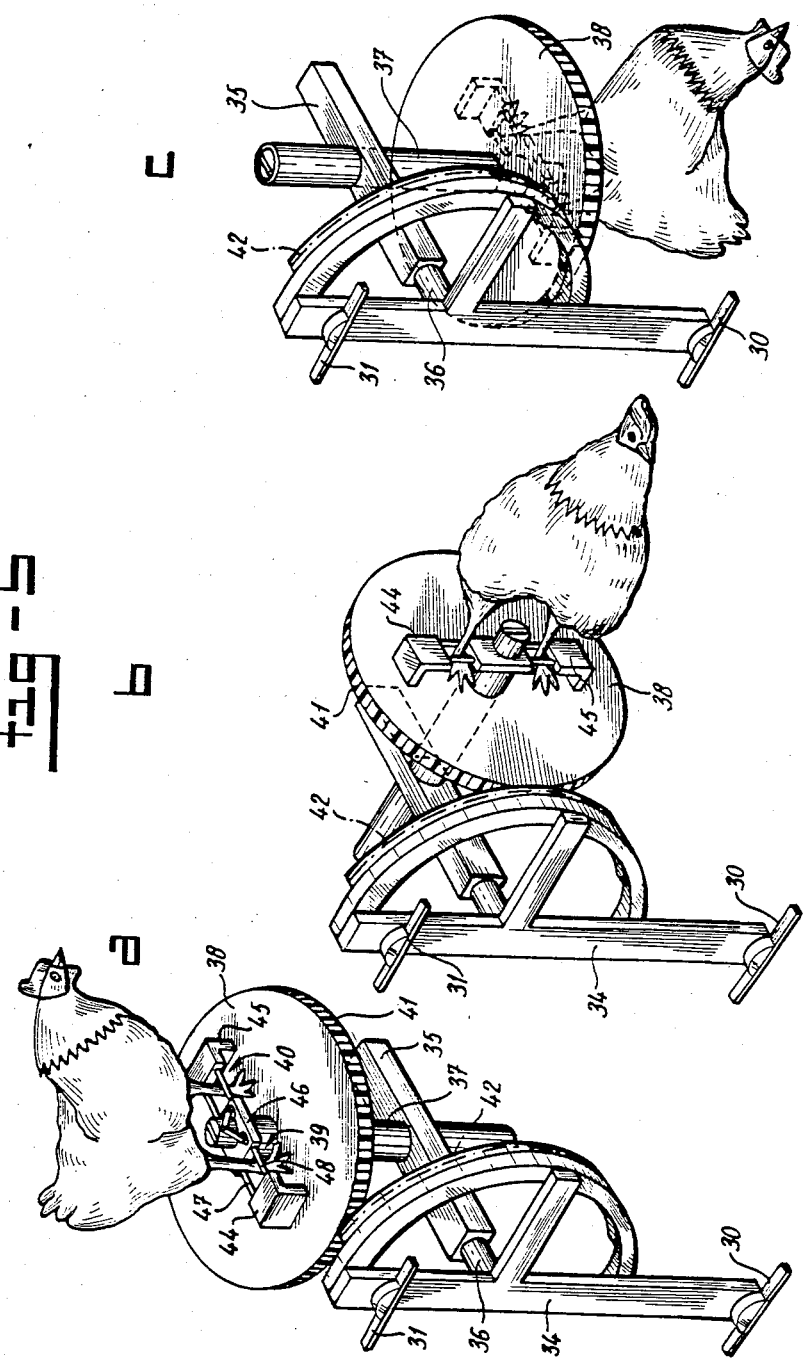

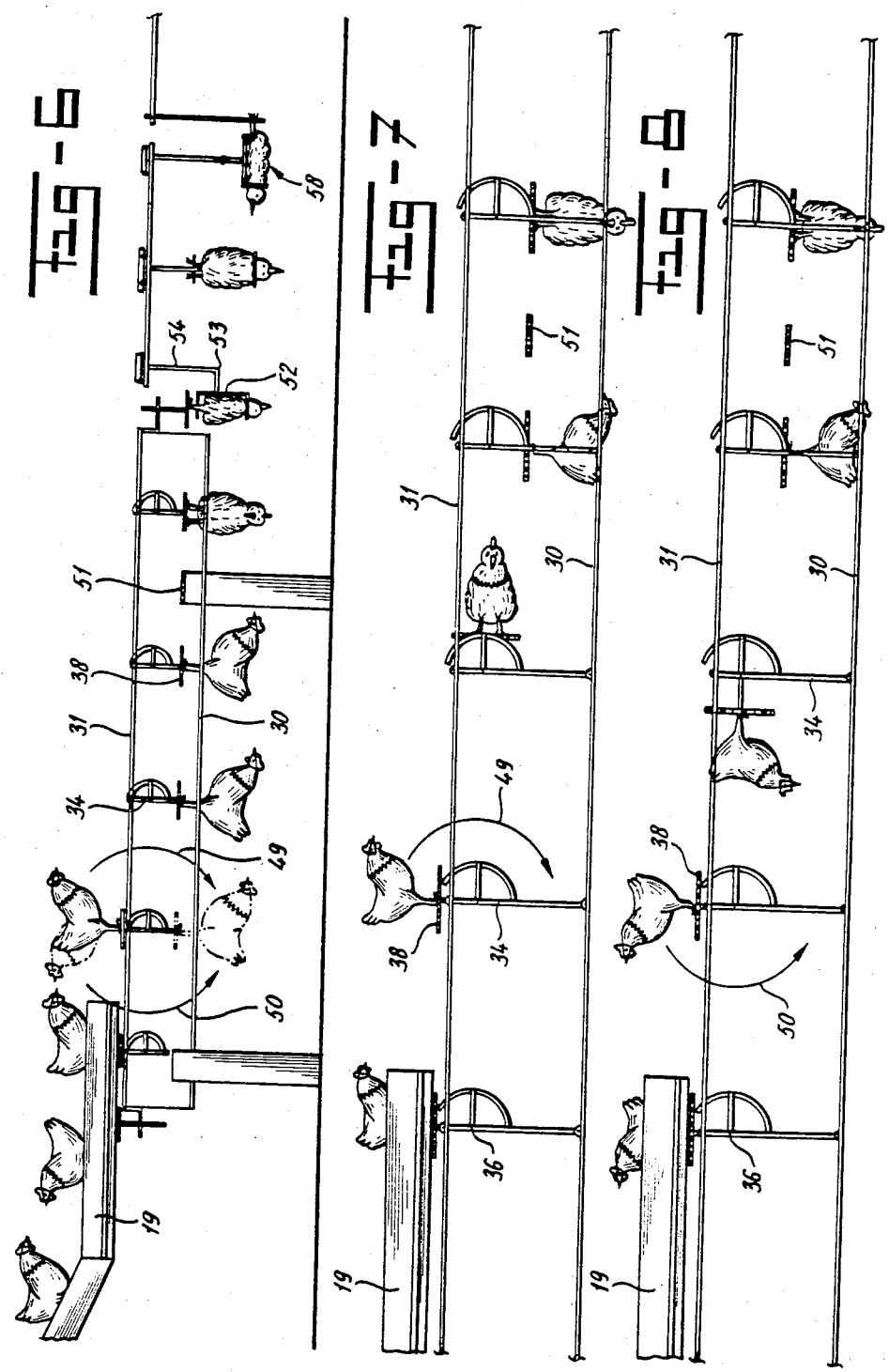

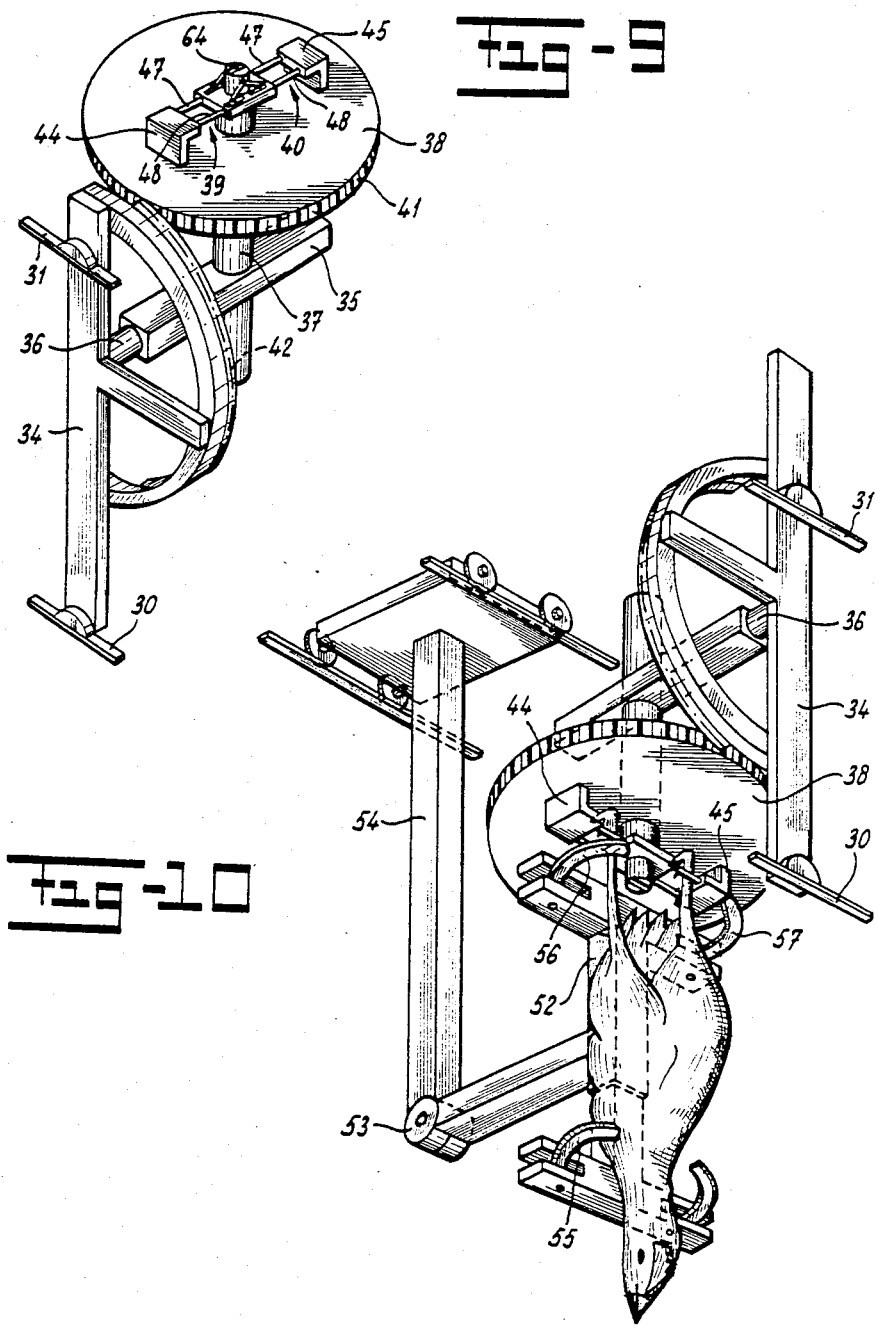

DEVICE FOR CONVEYING CHICKENS TO A SLAUGHTERING PLANT

BACKGROUND OF THE INVENTION

The invention relates to a device for conveying poultry for slaughter, such as chickens, to a slaughtering plant, said device being provided with means for separating the chickens, separating the legs and taking up the legs of the chickens in clamps, and conveying the chickens hanging by their legs to a conveyor running through the slaughtering plant.

Such a device is known, for example from European Patent Application No. 0,044,362 or U.S. Pat. No. 4,307,683.

This known device is based on the principle that at the chicken farm, i.e. where there is a large quantity of chickens, they are driven into gangways which take the chickens in rows to a conveyor belt which carries the chickens via a leg spreader—which is provided for each row—to leg clamps, after which the chickens are taken in the clamps with their heads hanging down to a conveyor device and are then conveyed to the slaughtering plant. This method of collecting slaughter chickens seems very efficient, but it still has a large number of disadvantages. First of all, the chickens have to be rounded up, and there is a great deal of trouble to get them into the gangways. At the chicken farm, the collection has to take place in daylight, and chickens which one tries to drive towards a machine try to escape. The normal method of collecting the chickens by hand, by putting them in crates, works better in practice.

When the chickens have been placed with this known device in the conveyor unit, there often follows a long journey in which the chickens are in an undesirable position. This means that the quality of the meat deteriorates and that even some of the chickens are already dead on arrival at the slaughtering plant. These are then no longer suitable for slaughtering, since they have not been able to bleed.

SUMMARY OF THE INVENTION

The object of the invention is to produce a device by means of which the chickens for slaughter are put in the correct position and at the correct distance from each other just before slaughtering and are automatically passed to the slaughtering plant.

This object is achieved according to the invention in that the device is provided with a feed-regulating disc on which the chickens, which have been supplied in any desired position in crates or the like, can be deposited, and which is provided with at least one discharge opening with periodically opening and shutting closure, to which discharge opening is connected a chute which exits above a conveyor belt running transversely and having above it stationary guide plates which—at least over the last part of their length—are at a distance from one another which corresponds to the width of a chicken, while just at the end of this belt there is a leg spreader, and the guide plates there have longitudinal grooves for guide belts which can move at the same speed as the conveyor belt and are provided with transverse pins projecting into the guide track and being at a distance from one another to form compartments which each take one chicken, and that connected to the end of this conveyor belt is an endless conveyor with a part running in the same direction, said conveyor being provided at regular intervals with turntables with leg clamps, the turntables being attached to an arm which is connected rotatably about a horizontal transverse spindle which stands at right angles to the direction of movement, to the conveyor and bears the turntable so that it rotates about a vertical spindle, and there is provision for means with which each turntable can rotate about the horizontal spindle at a distance from the end of the belt, in such a way that when it rotates about the horizontal spindle in one direction the turntable makes a turn of 180° about the vertical spindle and when it rotates about the horizontal spindle in the other direction it does not turn, to which conveyor a second endless conveyor connects, with a part running adjacent to it and at the same speed as the first conveyor, which second conveyor is provided, at distances from one another which correspond to the distances between the turntables, with clamping frames with clamps for the legs and the neck of a chicken, said frames being rotatable through 90° about a horizontal longitudinal spindle, which second conveyor also has a part which runs alongside and in synchronisation with the conveyor of the slaughtering plant with slaughter hooks at the same distances from each other as the frames from the second conveyor, said hooks being such that the legs of the chickens are taken up and taken over in them during the rotation of the frames through 90°. The chickens therefore first land on a feed-regulating disk, for example by being slid out of a crate in which they have been supplied. The desired number of chickens on the feed-regulating disc are then allowed through one by one to a chute which takes them to a conveyor running crosswise to it. This already produces a certain aligning effect, and where the guide plates allow through only the width of a chicken, the chickens will be guided, either head forward or head backward. All this can take place in the dark. If there is no light, the chickens stay where they are and do not fly away, so that they can be guided standing in this way. They then go via the guide belts with pins and through the spreading device with their legs into the clamps of a turntable which, through the correct synchronisation of the first conveyor, is just there when a chicken comes in. With this turntable, the chicken is swung down into the hanging position, and the turntable is designed in such a way that a chicken going head forward will be turned 180°, while a chicken with its head backward will not be turned. This can be achieved in a simple manner by placing the clamps on the turntable in the plane through the horizontal axis of rotation of the arm of the turntable. A chicken which goes head forward has its centre of gravity forward of that axis, and on release from the turntable therefore falls head first, while a chicken with its head backwards will fall backwards in relation to the direction of forward movement. It must then only be ensured that for the forward and backward falling movement a rotation through 180° does not take place, which results in all chickens having their heads in the same direction. They are subsequently all turned again by 90°, so that they can be taken over by the clamping frames of the second conveyor, which moves in synchronisation with and alongside the first conveyor and has frames which can be swung on a horizontal longitudinal spindle with clamps which then close round the legs and neck of a chicken held in front of them. The leg clamps are then released, after which the chickens are taken on by the second conveyor and are swung from the vertical position in which they were picked up into a horizontal position with the leg clamps directed outwards. This swinging from the vertical position to the horizontal position takes place when the second conveyor runs alongside and in synchronisation with the conveyor device of the slaughtering plant, as a result of which the legs are hung in the slaughter hooks and taken over. All clamps to be closed or opened here can easily be operated by remote control or in any other suitable fashion, as is generally known in the art. The essence of it is that the chickens can be supplied in a protected fashion and in a normal state, using crates, and can then undergo processing in the dark, which takes them one by one automatically into the slaughter hooks of the slaughtering plant, where they are stunned, bled and further processed automatically in a way which is known per se.

According to the invention, the feed-regulating disc can be designed in such a way that it has a wall following its periphery, in which the discharge opening is located, and the door of the opening consists of two plates hingedly connected to one another about a vertical spindle, one facing inwards and being hingedly connected to the wall at a point past the opening, and the other facing the wall with the front edge towards a point situated before the discharge opening, said plates being held at an angle by a spring, and further means being provided to move the plates periodically away from and towards the opening. With this closure, it is possible during the closing movement for the plate facing the wall, after touching the wall, to make a sliding movement contrary to the direction of rotation of the disc, which prevents chickens, following the chicken which has been let through, from becoming jammed.

Instead of one discharge opening, the feed-regulating disc can, of course, have several discharge openings, each with the appropriate further processing mechanism.

The tilting of the turntable can be determined by the centre of gravity of the bird arriving with its legs in the leg clamps, and the rotation through 180° can be produced by providing the turntable with a crown gear which operates in conjunction with a rim in a vertical plane which extends through 180°. If the turntable falls in the direction in which the crown gear is also running, then the turntable turns through 180°. If the turntable falls the other way, then there is no turning. In an embodiment of the turntable with crown gear, it can also be used to advantage, after it has swung down, for producing another rotation through 90° by placing a horizontal toothed strip further on in the track of the first conveyor.

It is also preferable according to the invention for the frames of the second conveyor to be designed in such a way that the neck clamp and the leg clamps can be moved towards and away from each other. In this way, it is possible when suspending the legs of a chicken from the slaughter hooks for the chicken first to be pushed with its legs through the leg clamps so far that the legs extend far beyond the clamps and can thus be suspended more securely and with greater accuracy from the slaughter hooks. When this has taken place, the clamps of the frame return to the position in which they release the chicken.

The device according to the invention can be designed in such a way that the feed-regulating disc has connected to it two discharge chutes with accompanying conveyor belt and first conveyor, the two first conveyors taking the chickens which have been placed in the correct position to one single second conveyor. The latter operates at the same speed as that of the conveyor which passes through the slaughtering plant, while the other two travel at the same speed, but with a distance between the turntables which is twice the distance between the clamp frames.

It is pointed out that each time that a turntable or a frame has to be taken or returned to another position and/or clamps have to be closed or opened, this can always be achieved at the right time with means which are generally known per se in the art, such as cams, guide tracks, electrically or pneumatically operable locking mechanisms, etc.

The invention will now be explained in greater detail with reference to the drawings of a preferred embodiment.

BRIEF DESCRIPTION OF THE DRAWINGS

FIG. 1 shows schematically in perspective an embodiment of the device according to the invention.

FIG. 2 is a top view of FIG. 1.

FIG. 3 shows in perspective the conveyor belt part which connects to the feed-regulating disc.

FIG. 4 shows in perspective the discharge end of the conveyor belt of FIG. 3.

FIGS. 5a, 5b and 5c show schematically in perspective the mode of operation of the mechanism for turning a chicken from a heads up position to a hanging, heads down position and simultaneously rotating it 180°.

FIGS. 6, 7 and 8 show a side view of the principle of placing a chicken in the correct position from the conveyor belt into the successive conveyors.

FIG. 9 shows in perspective a detail of a leg clamp.

FIG. 10 shows in perspective a frame of the second conveyor with clamps.

DESCRIPTION OF THE PREFERRED EMBODIMENT

Figure 11:
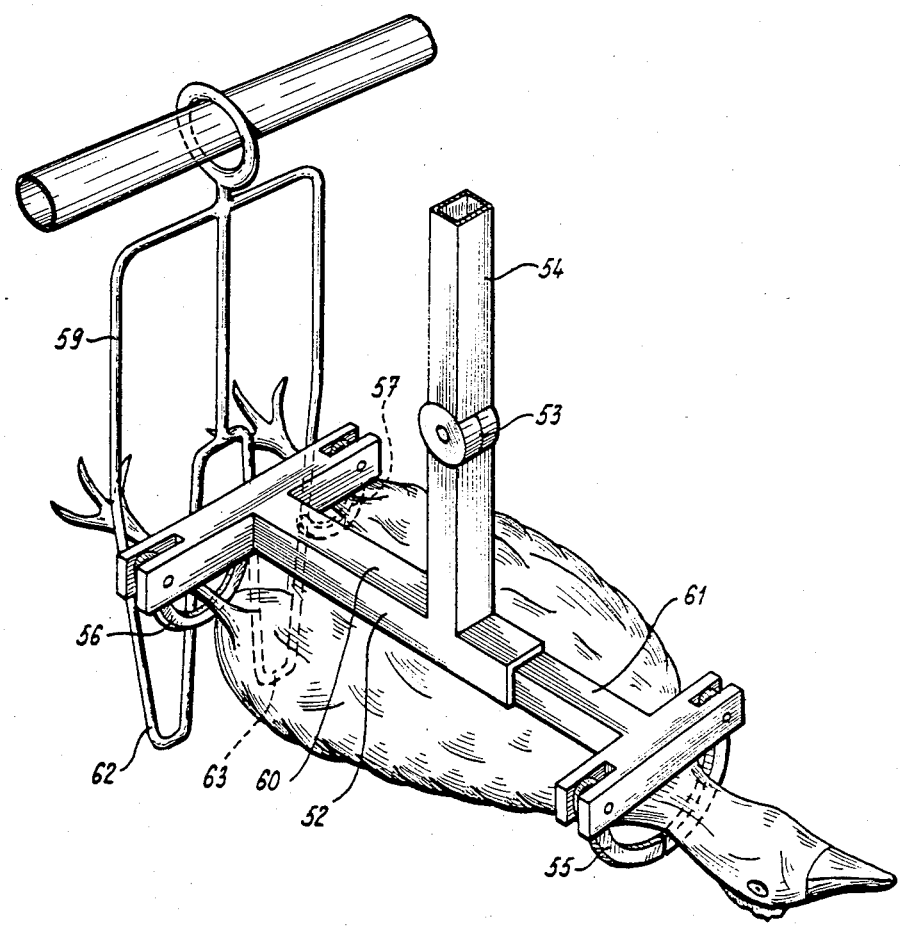
FIG. 11 shows the frame of FIG. 10 in the position in which transfer to the slaughter hook takes place.

The device shown in FIG. 1 comprises a feed-regulating disc 1, two conveyor belts 2, two first conveyors 3 for correct positioning of the chickens brought in by the belt 2 and one single second conveyor 4 which takes over the chickens from the conveyors 3 and carries them to the slaughtering line 5.

In the drawings, each main group is therefore indicated by the reference numerals 1 to 5 used above.

The feed-regulating disc 1 consists of a circular plate which is supported rotatably in a manner not illustrated and can be driven in such a way that it rotates slowly in the direction of the arrow 6. Above the disc there is a stationary cylindrical wall 7, which at two points is provided with a discharge opening 8 which can be opened and closed by means of a door 9, which consists of a long plate 10 which at 11 is hingedly connected to the inside of the wall 7 at a point situated past the discharge opening 8, and of a short plate 12 which at 13 is hingedly connected to the plate 10, and which is held by spring devices (not illustrated) at an angle relative to the plate 10. At 14, there is an operating cylinder, by means of which the plate 10 and thus also the plate 12 can be moved away from the discharge opening, as a result of which a chicken can be conveyed further along the outward-facing edge of the short plate 12 in the direction of the opening 8. If the operating cylinder 14 immediately afterwards closes the discharge opening, the short plate 12 will run at an angle against the inner wall 7 and slide along there in a direction contrary to the direction of rotation of the disc, and with this closing movement the angle between the plates 10 and 12 is increased. As a result, the short plate 12 slides along the inner side of the wall 7 and thereby prevents the next chicken from becoming jammed.

At 15 there is a feed chute, by means of which the chickens taken from, for example, a crate can be taken to the feed-regulating device.

Connected to each discharge opening 8 is a chute 16 which exits at the top part of the conveyor belt 17, which runs at right angles to the direction of the chute and moves in the direction of the arrow 18. Above this belt are guide plates 19 and 20 which, at least near the end at 21 and 22, are placed so close together that a chicken fits through only in the longitudinal direction. The chickens coming out of the chute 16 fall after a short distance down onto the belt 17, and the shock reaction causes them to stretch their legs. This already brings them largely into the correct position. The narrow part 21, 22 then ensures that each chicken brought in by the belt 17 is in a position with its head facing forward or back, as shown in FIG. 3. At the narrow part 21, 22 the side plates are provided with grooves 23, 24, through which project pins 25 from two endless belts, indicated by 26, 27, said pins 25 being at such a distance from each other that between successive pins there is a compartment which takes only one chicken.

Above the end of the belt 17 there is a tongue 28 with a pointed front end 29 which is a short distance above the belt 17 and, between the side plates 21, 22 and the tongue 28, leaves gaps which provide sufficient room for a leg, The tongue 28, 29 acts as a spreader of the legs.

The first conveyor 3 consists of bottom and top flexible belts 30 and 31 respectively, which run over guide tracks (not illustrated) and over reverse wheels 32, 33 (FIG. 2), these belts 30, 31 being provided at regular intervals with vertical cross-connecting rods 34. These vertical connecting rods 34 support a horizontal transverse rod 35, which is rotatable about the axis of rotation 36, and which carries a pin 37 on which is supported the turntable 38 so as to be rotatable about a vertical central spindle. This turntable 38 bears leg clamps 39 and 40 and on the periphery is provided with a toothed strip 41. The vertical rods 34 carry a fixed toothed strip 42, which lies in a vertical plane and with which the toothed strip 41 of each turntable 38 can engage.

As can be seen from FIGS. 1 and 2, the first conveyor 3 with the turntables 38 passes under the conveyor belt 17.

It may even be preferable to have the conveyor belt 17 ending at 43, i.e. before the area where the belts 26 and 27 with the pins 25 are operational, and at the point of the belts 26 and 27 to support the chickens with a stationary slide plate, for the conveyance is always ensured by the pins 25, and if such a plate is used as a supporting base for the legs of the chickens, it is possible to bring the turntables 38 closer to the level of the legs.

This can also be achieved if, where the conveyor belt 17 ends and where the leg spreader 28, 29 begins, and where the belts 26, 27 also begin, the chickens are not given any support with a bottom plate, but have to rest on the tongue 28, while the legs hang down freely.

The conveyor 3, which moves in synchronisation with the belts 26 and 27 now moves in such a way that each time that a chicken is released by the belts 26, 27 it lands precisely with its legs in the leg clamps 39 and 40 on a turntable 38. This situation is sketched in FIG. 4 and shows how the chicken lands with its legs in the clamps 39, 40, consisting of inverted L-shaped pieces 44, 45 and a central part 46 with horizontally adjustable pins 47, 48, which are shown in the open position in FIG. 4 and in the closed position in FIG. 5. The chicken is then on a turntable 38 which moves off further from the conveyor belt device 2.

FIGS. 6 to 8 then show what happens as a result of the position of the centre of gravity of the chicken in relation to the horizontal hinge pin 36 of the turntable. A chicken which lies with its centre of gravity forward of that hinge pin will, as shown in FIG. 7 and in FIG. 6 by the arrow 49, tilt forward in the clockwise direction. With this tilting forward, which could be prevented previously by a locking mechanism, the turntable 38 with its teeth 41 runs through the teeth 42 and will then, as indicated in FIGS. 5a, b and c, make a rotation through 180°, so that on arrival in the lowest position the chicken is again directed with its head forward.

FIG. 8 shows that a chicken which was brought in with its head facing backwards has its centre of gravity to the left of the hinge pin 36 and and as a result after unlocking will make a turn counter-clockwise, as indicated by the arrow 50. With this turning movement the teeth 41 of the turntable 38 are not in contact with the teeth 42, and the chicken therefore swings down without being turned about its axis, and thus also assumes the position shown on the right in FIG. 8, with its head facing forward.

After this, all chickens move with the teeth of the turntable 38 along a stationary toothed strip 51, so that they are all turned through 90° and the legs of each chicken go into a position in which they are in a plane parallel to the vertical plane of the advance device of the part of the conveyor 3 concerned.

This conveyor 3, before it reaches its turning point, now runs parallel to and right alongside the second conveyor 4, also consisting of an endless conveyor device, the support and guide of which are not shown, and which has frames 52 which are suspended from a vertical rod 54 to pivot about a horizontal longitudinal spindle 53. The frames 52 have a neck clamp 55 and leg clamps 56, 57.

The two conveyors are again synchronised in such a way that a turntable 38 always comes next to a frame 52 in such a way that the neck clamp 55 can grip around the neck of the chicken and the leg clamps 56 and 57 around the legs. The leg clamps 39 and 40 are then released again and the chicken is taken over by the conveyor 4.

The chicken then hangs in the frames 52 in the way schematically illustrated in part 4 of FIG. 6.

By turning about the horizontal longitudinal spindle 53, the frames can be taken into the horizontal position shown at 58. The legs then stick out of the leg clamps 56, 57. The conveyor 4 again runs in synchronisation with the conveyor device 5 with the slaughter hooks 59, so that the legs hanging out end up in the slaughter hooks 59. When the clamps 55, 56 and 57 are then released, the bird hangs on the slaughter line. It is still alive, but has gone through the handling of the device, and particularly the hanging upside down, for only a short period of time.

It will be clear that each conveyor 3 or 4 is provided with the means with which the turntables 38 are returned to the correct position and swung up again, and with which the frames 52 are returned to the vertical position.

FIG. 10 shows on a larger scale the transfer of a chicken hanging on a turntable 38 to the clamps 55, 56 and 57 of a frame 52.

FIG. 11 shows the frame 52 in the horizontally swung position at the time at which the legs of the chicken are transferred to the slaughter hooks 59. The clamps 55, 56 and 57 are then still in the closed position.

As can be seen from FIG. 11, the frame 52 can be telescopic and consist of a T-piece 60 with the leg clamps 56 and 57 and a T-piece 61 with the neck clamp 55. This telescopic design has the advantage that, when in the position shown in FIG. 11, the T-piece 61 with the neck clamp 55 is moved in the direction of the leg clamps 56 and 57, the legs are pushed outwards through the leg clamps 56 and 57 and can then be taken up more easily in the suspension loops 62 and 63 of the slaughter hook 59.

FIG. 9, finally, shows again a turntable 38 of the conveyor 3 and indicates how, by means of a slideable rod 64, the pins of the leg clamps 39 and 40, i.e. the pins 47 and 48, can be withdrawn and in this way can release the legs.

I claim:

1. A device for conveying poultry to a slaughtering plant, comprising:
    (a) first conveyor means for conveying poultry in spaced apart arrangement in an outfeed direction,
    (b) leg spreading means for spreading the legs of each poultry on the first conveyor means,
    (c) second conveyor means adjacent the first conveyor means,
    (d) a plurality of longitudinally spaced pairs of leg clamps on the second conveyor means for clamping the spread legs of poultry,
    (e) means mounting each pair of leg clamps on the second conveyor means for rotating the leg clamp pair to hang each poultry head down and facing the same direction,
    (f) third conveyor means adjacent the second conveyor means,
    (g) a plurality of longitudinally spaced leg and neck clamp assemblies on the third conveyor means each arranged to register with one pair of the leg clamps on the second conveyor means during simultaneous movement of said second and third conveyor means and operable to transfer a poultry hanging in the pair of leg clamps of the second conveyor means to a leg and neck clamp assembly of the third conveyor means,
    (h) means mounting each leg and neck clamp assembly on the third conveyor means for rotating the leg and neck clamp assembly to move a clamped poultry to substantially horizontal position with the poultry legs projecting therefrom,
    (i) fourth conveyor means adjacent the third conveyor means, and
    (j) a plurality of longitudinally spaced slaughter hooks on the fourth conveyor means each arranged to register with one of the leg and neck clamp assemblies on the third conveyor means during simultaneous movement of the third and fourth conveyor means and operable to engage the poultry legs projecting from the leg and neck clamp assembly and transfer the poultry to the fourth conveyor means for delivery to the slaughtering plant.

2. The device of claim 1 including poultry delivery mechanism for delivering poultry to the first conveyor means, comprising:
    (a) a rotary feed regulating disc upon which to deposit poultry to be slaughtered,
    (b) a wall about the disc having a discharge opening therein,
    (c) a door mounted on the wall for periodically opening and closing the discharge opening, the door comprising two sections connected together pivotally at one of their ends, the opposite end of one door section being connected pivotally to the wall on the downstream side of the discharge opening relative to the direction of rotation of the disc, the end of the second door section opposite its pivot connection to the one door section being retractably engageable with the wall on the upstream side of the discharge opening, and
    (d) power means engaging the door for moving the door sections to open and close the discharge opening.

3. The device of claim 1 wherein the means mounting each pair of leg clamps on the second conveyor means comprises:
    (a) a turntable supporting a pair of leg clamps,
    (b) an arm mounting the turntable for axial rotation,
    (c) a horizontal pivot shaft carried by the second conveyor means and mounting the arm for rotating the turntable about the axis of the pivot shaft,
    (d) operating means engaging the turntable for rotating the turntable axially as the pivot shaft rotates in one direction only,
    (e) the pair of leg clamps being positioned on the turntable to locate the center of gravity of a poultry to one side or the other of a vertical plane through the pivot shaft, whereby to cause the pivot shaft to rotate in one direction or the other and thereby face all downwardly hanging poultry in the same direction.

4. The device of claim 3 wherein the operating means comprises a gear on the circumference of the turntable and a segment gear on the second conveyor means engageable with the gear on the turntable only during rotation of the pivot shaft in said one direction.

5. The device of claim 4 including a fixed gear in the path of movement of the second conveyor means engageable with the turntable gear in the poultry hanging position during longitudinal movement of the second conveyor means to rotate the turntable 90°.

6. The device of claim 1 wherein each leg and neck clamp assembly includes a pair of supports mounted for movement toward and away from each other, one of the supports mounting the leg clamps of the assembly and the other support mounting the neck clamps of the assembly, whereby to render a poultry moveable to project its legs toward the slaughter hooks.

* * * * *

UNITED STATES PATENT AND TRADEMARK OFFICE
CERTIFICATE OF CORRECTION

PATENT NO. : 4,658,476
DATED : 21 April 1987
INVENTOR(S) : Hendrikus G. van den Brink It is certified that error appears in the above-identified patent and that said Letters Patent are hereby corrected as shown below:

Column 2, line 56, delete "forward and".

Signed and Sealed this

Twentieth Day of October, 1987

Attest:

DONALD J. QUIGG

*Attesting Officer*  *Commissioner of Patents and Trademarks*